July 17, 1962 A. J. MAINZER 3,044,881
METHOD FOR CANDYING VEGETABLE MATERIAL
Original Filed March 24, 1959
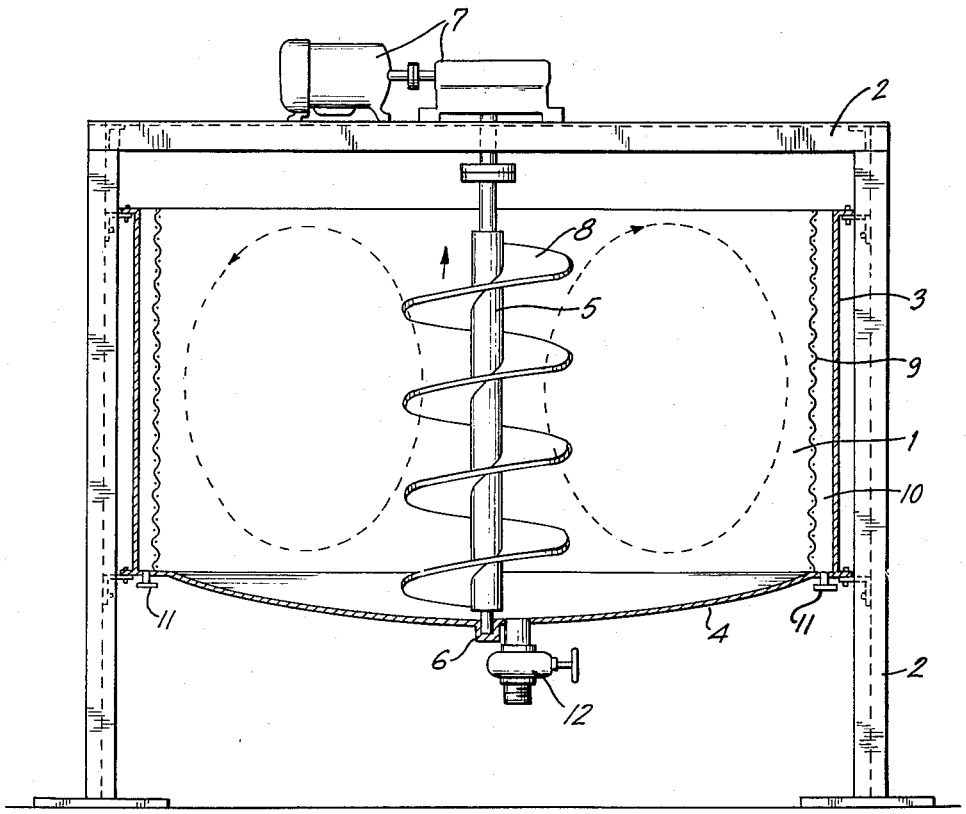
INVENTOR.
ADOLF J. MAINZER 3,044,881
METHOD FOR CANDYING VEGETABLE
MATERIAL
Adolf J. Mainzer, 34—29 80th St., Jackson Heights, N.Y.
Original application Mar. 24, 1959, Ser. No. 801,613.
Divided and this application Oct. 8, 1959, Ser. No.
845,208
4 Claims. (Cl. 99—102)

The present invention relates to a method for candying liquid-containing and liquid-permeable vegetable material, and more particularly it relates to a process which may be advantageously used for producing candied fruit.

The present application is a divisional application of my co-pending application Serial No. 801,613, filed on March 24, 1959, and entitled "Method and Apparatus for Candying Fruit and the Like."

Essentially, the process of candying fruit consists of slowly impregnating fruit with sugar syrup until the sugar concentration in the fruit is high enough to prevent spoiling. It is important that this process be carried out in such a manner that the fruit neither softens nor becomes too tough or shriveled. Commonly this is accomplished by repeated heating and storage of the fruit in syrups of progressively increasing sugar concentration. The impregnation of the fruit (or other vegetable particulate material) is conventionally carried out by introducing into a tank pre-treated fruit or cut fruit, adding sufficient warm concentrated syrup to cover the fruit, and gently stirring the fruit and syrup mixture. The water of the fruit and the syrup surrounding the same will tend to form a homogeneous solution, i.e. syrup or the sugar contained therein will diffuse into the fruit cells and water will diffuse outwardly through the cell walls of the fruit into the surrounding syrup. Thereby the concentration of the sugar in the surrounding syrup will be reduced and an increasing sugar concentration will be formed within the fruit cells, until substantially a sugar concentration equilibrium has been established within the fruit or other vegetable material and the surrounding syrup. It is essential that at the beginning of the diffusion process the sugar concentration differential between the water inside the vegetable cells and the surrounding syrup is not too great. If this differential is too great, particularly if substantially sugar-free fruit is treated with a syrup of very high sugar concentration, the osmotic forces will become so great as to cause rupture of fruit cells and thereby preventing the formation of candied fruit of desired shape and texture. All this has long been recognized and consequently the fruit or the like is first immersed in a syrup of relatively low sugar concentration, allowed to stand, preferably while being stirred occasionally, until the sugar concentration in the fruit has risen and the sugar concentration in the surrounding syrup has been lowered to the desired extent, thereafter the thus-diluted syrup is withdrawn and replaced with syrup of higher concentration, until after several replacements of syrup with syrup of higher concentration, the sugar content of the fruit or the like has risen to the desired final value.

Thus, the candying of fruit usually requires a very long period of time frequently lasting several weeks. The stirring of the hot mixture of fruit and syrup is a delicate operation, and at the same time requiring very considerable force, since on the one hand the syrup-fruit mixture is a viscous mass, on the other hand damage to the individual fruit particles should be avoided. Due to the long period of time for which a given quantity of fruit has to be treated with syrups of progressively increasing concentration, the output per tank unit is relatively small and thus great investments in equipment and floor space have to be made in order to be capable of producing the large quantities of candied fruit which are commercially required to fill the seasonal demands for this product.

Conventional methods of candying fruit and the like have been amply described in the technical literature, and reference is made in this connection, for instance, to Cruiss, "Commercial Fruit and Vegetable Products," the latest edition of which was published in 1958.

It is therefore an object of the present invention to overcome the above-described difficulties in the production of candied fruit and the like.

It is another object of the present invention to provide a method for impregnating fruit and the like in a simple and economical manner.

It is a further object of the present invention to provide a method for candying fruit and the like by means of which the processing time can be greatly reduced.

It is yet another object of the present invention to provide a method for candying fruit or the like which will allow intimate mixing of fruit and syrup without causing damage to the individual fruit particles.

Other objects and advantages of the present invention will become apparent from a further reading of the description and of the appended claims.

With the above and other objects in view, the present invention includes in a method of candying particulate liquid-containing and liquid-permeable vegetable material, the steps of introducing the particulate material and an aqueous sugar-containing solution into a container to form a horizontal layer of the particulate material in the solution, moving a vertical column of the layer and solution in vertical direction so as to effect movement of the particulate material and of the solution along annular paths located in vertical planes whereby continuous treatment of superposed horizontal strata of the layer by differently concentrated horizontal strata of the solution is prevented and the concentration of sugar in the solution is uniformly reduced while the concentration of sugar in the particulate material is uniformly increased, and withdrawing the solution when the material has a selected concentration of sugar.

According to a preferred embodiment of the present invention, the method of impregnating particulate vegetable material with a solute dissolved in a solvent which is miscible with the liquid of the vegetable material, comprises the steps of introducing the particulate vegetable material and the solution into a treating vessel, subjecting the vegetable material and the solution in the treating vessel to an annular motion about a substantially horizontal annular axis so as to cause relative movement between the particles of the vegetable material and adjacent portions of the solution, whereby stratification of the vegetable material and the solution in the treating vessel is avoided and a substantially even concentration of the solute is maintained throughout the entire solution, so that solute will pass from the solution into the vegetable material, thus increasing the concentration of the solute in the vegetable material and reducing the concentration of the solute in the solution, withdrawing at least a portion of the solution of thus-reduced concentration, and replacing the thus-withdrawn solution with a solution of higher solute concentration.

Broadly, an apparatus for candying particulate liquid-containing and liquid-permeable vegetable material, according to the present invention, comprises, in combination, a container having side wall means and bottom wall means and being adapted to contain an aqueous sugar-containing solution and a horizontal layer of the particulate material in the solution, movable means located in the container for moving a vertical column of the layer and solution in vertical direction so as to effect movement of the particulate material and of the solution along annular paths located in vertical planes whereby continuous treatment of superposed horizontal strata of the layer by differently concentrated horizontal strata of the solution is prevented and the concentration of sugar in the solution is uniformly reduced while the conrentration of sugar in the particulate material is uniformly increased, and means for withdrawing the solution when the material has a selected concentration of sugar.

The present invention may be carried out, for instance, in an apparatus which comprises, in combination, a container having bottom wall means and side wall means, the side wall means including outer solid side walls and inner liquid-permeable side walls formed with passages therethrough, the container being adapted to contain within the outer side walls an aqueous sugar-containing solution and within the inner side walls a horizontal layer of the particulate material in the solution, screw means having a vertical axis and being mounted in the container spaced from the side wall means for rotary movement about the vertical axis for moving during rotation of the screw means particulate material and solution located on the surface of the screw means in a vertical column in vertical direction so as to effect movement of the material and of the solution along annular paths located in vertical planes and partly defined by the side wall means and bottom wall means, the screw means having an outer diameter substantially smaller than the distance between the screw means and the side wall means, outlet means for the solution located in the bottom wall means in the area intermediate the outer and inner side walls, other outlet means for the particulate material located in the bottom wall means in the area within the inner side walls, and means for rotating the screw means.

The present invention also contemplates impregnating particulate vegetable material with solute dissolved in a solvent so as to form a solution, for instance in an apparatus, comprising, in combination, tank means having a bottom wall and a side wall, helical means including a screw of predetermined diameter extending vertically throughout substantially the entire tank means being spaced from the side wall of the tank means at a distance considerably greater than the predetermined diameter, means for turning the screw in opposite directions, means for introducing solute-containing solution and particulate vegetable material, respectively, into the tank means, and means for withdrawing only solution from the tank means, the last named means including a foraminous wall arranged in the tank means adjacent to but spaced from at least a portion of one of the walls of the tank means and defining with the portion of the wall of the tank means a space into which solution may enter through the foraminous wall, the foraminous wall preventing entry of particulate vegetable material into the space, and also including withdrawal means communicating with the space for withdrawing solution therefrom.

The novel features which are considered as characteristic for the invention are set forth in particular in the appended claims. The invention itself, however, together with additional objects and advantages thereof, will be best understood from the following description of specific embodiments when read in connection with the accompanying drawing which shows an elevational view partially in cross-section of an apparatus for carrying out the present invention.

Referring now to the drawing, the apparatus according to the present invention is shown to comprise a container 1 held in a supporting structure 2. The container or tank means 1 are shown to be of substantially cylindrical configuration having an annular side wall or side wall means 3 and a dished bottom wall or bottom wall means 4. Helical means or screw means are shown including screw 5 extending vertically and coaxially throughout substantially the entire container 1. Screw 5 is shown mounted in a foot bearing 6 at its lower end and connected to means for rotating screw 5, including motor and gear reducer 7 mounted on the upper portion of supporting structure 2. Screw 5 has a helical surface 8 extending transverse to the vertical axis of screw 5 and serving for moving during rotation of screw 5 particulate material and solution located in tank 1 and in part along helical surface 8, in a vertical direction, upwardly or downwardly depending on the direction of rotation of screw 5. When screw 5 moves in upward direction as indicated by the arrow, the entire mass of particulate vegetable material and sugar syrup contained in tank 1 will be thus moved substantially as indicated in dotted lines and by double-headed arrows. It can be seen that individual portions of the material and of the solution will thus be caused to move along annular paths located in vertical planes, and that the entire mass will move in treating vessel 1 along an annular path about a substantially horizontal annular axis. By reversing the direction of rotation of screw 5, the direction of movement of the material along its annular path will also be reversed.

The movement of the particulate material and of the solution induced by rotating screw 5 will break up any stratification which might have been formed in the tank between areas of greater and lesser concentration of particulate material in the solution, and also between areas of greater and lesser sugar or solute concentration in the solution.

It has been found preferable, in order to obtain best results with respect to equalization of the mass in tank 1 without exerting damaging force or pressure on the particulate material, to arrange screw 5 coaxially with or in the center of container 1. The outer diameter of screw 5 is substantially smaller than the distance between screw 5 and side walls 3. Very good results have been obtained with a cylindrical container having an inner diameter being about four times as long as the outer diameter of screw 5.

As described further above, during the treatment of vegetable particulate material with sugar-containing solutions for the purpose of producing candied fruit, it becomes necessary from time to time to replace the syrup in tank 1 with syrup of higher sugar concentration, and/or syrup of higher temperature. The particulate vegetable material is to remain in tank 1 during the exchange of all or part of the syrup therein. Thus, means are provided for withdrawing only solution or syrup from tank means 1 while retaining the particulate vegetable material in the same. These means for withdrawing solution comprise, as illustrated, a foraminous wall 9 arranged adjacent to but spaced from at least a portion of one of the walls 3 and 4. According to the illustrated embodiment, foraminous wall 9 is formed of a cylindrical wire mesh located in tank 1 coaxial with side wall 3 thereof and contacting bottom wall 4. Thus, between side wall 3 and foraminous wall 9 a space 10 is formed into which solution may enter from the inner portion of tank 1 through foraminous wall 9, foraminous wall 9, however, preventing entry of the particulate vegetable material into space 10. Foraminous wall or liquid-permeable side walls 9 formed with passages therethrough will thus separate the treating mixture in the container into a mixture of particulate vegetable material and solution located within the major portion of the interior of container 1, and into syrup or solution free of particulate material located in the space defined between outer wall portions of the container and foraminous wall 9. The above described means for withdrawing syrup include in addition to foraminous wall 9, outlet or withdrawal means such as syrup drain outlet 11 communicating with space 10. In addition, outlet means such as outlet valve 12 are provided, communicating with the interior portion of tank 1 for the removal of particulate vegetable material and of such portion of the syrup or liquid as has been retained in the interior portion of tank 1. While it is possible to drain the material in tank 1 by withdrawing the major portion of the syrup through foraminous wall 9, it is generally preferred to withdraw through outlet valve 12 or the like a flowable mixture of syrup and vegetable particulate sugar-containing material and to drain the thus candied fruit in subsequent operations.

Referring again to the specific embodiment illustrated in the drawing, very good results were obtained with an apparatus as illustrated having the following overall dimensions:

| | |
|---|---|
| Inner tank diameter | 8' |
| Height of vertical side wall 3 | 4' |
| Outer screw diameter | 24" |
| Distance between side wall 3 and foraminous wall 10 | 3" |
| Diameter of syrup drain outlet 11 | 2" |
| Diameter of outlet valve 12 | 3" |
| Distance of adjacent vertically spaced points at the periphery of screw 5 | 24" |

A certain correlation has been found between the relationship of tank diameter to screw diameter and the rotational speed of the screw. As illustrated and described above, the screw diameter equals 25% of the tank diameter. This apparatus was successfully operated at 72 r.p.m. By somewhat increasing the diameter of the screw without changing the tank diameter, the rotational speed can be somewhat reduced, while in the case of a reduction of the screw diameter relative to the tank diameter the rotational speed of the screw is preferably somewhat increased. In any event, the relationship between the tank diameter and screw diameter must be such to allow upon turning of the screw for annular movement of the material in the tank about an annular, preferably horizontal axis. Thus, it is preferred to limit the screw diameter to between about one-third and one-fifth of the inner tank diameter.

The following example is given as illustrative only, the present invention, however, not being limited to the specific details of the example.

*Example*

The method of the present invention is described in the present example in connection with the candying of grapefruit peel in an apparatus such as described above.

6,000 lbs. of diced grapefruit peel, ⅜" by ⅜" which have been pre-treated in conventional manner for instance with sulfur dioxide are pumped into the tank through the open upper end of the same using water as vehicle. The water is drained off through foraminous wall 9 and syrup drain outlet 11.

After the diced grapefruit peel in the tank has thus become fairly dry, 1,038 gallons of a sugar syrup of 55% solids content and having a temperature of between 140 and 160° F. are pumped into the tank, again through the upper end of the same. The material in the tank is allowed to stand for one hour and thereafter screw 5 is rotated for about three minutes at about 72 r.p.m. Depending on whether syrup or fruit (i.e. grapefruit peel) has collected in the upper portion of the tank, the screw is rotated in upward or downward direction. If a layer of grapefruit peel has formed in the top of the tank while most of the syrup is located in the lower portion of the tank, the screw is rotated downwardly. On the other hand, if the fruit has settled on the bottom of the tank, the screw is rotated in upward direction.

In either case, the screw is rotated for a time sufficient to achieve thorough mixing of syrup and fruit in the tank and to obtain equalization in the form of a suspension of fruit in syrup. This usually is accomplished within about three minutes.

The suspension is then allowed to stand without rotating of the screw and thereby a slow settling of the fruit at the bottom of the tank takes place.

After about three hours, the mixture is again agitated for about three minutes by rotating the screw in upward direction, and this is again repeated after another three hours of allowing the contents of the tank to rest. Thereafter, the mixture in the tank is allowed to stand overnight and mixing by rotating of the screw for about three minutes is repeated the next morning. Analysis of samples of fruit and syrup taken after the last described mixing show that the sugar content of fruit and syrup has equalized at about 37%.

On the second day, after the above-described morning-mixing, the thus-diluted syrup is withdrawn through foraminous wall 9 and drain outlet 11, and a syrup of 71% solids content is introduced at a temperature of between about 120 and 130° F.

Mixing and resting is repeated as described in connection with the first introduced syrup. After the mixing on the morning of the third day it is found that the sugar content of fruit and syrup amounts to 58%.

The process is now repeated by withdrawal of the spent syrup and introduction of a syrup having a solids content of 81% and a temperature of between 105 and 120° F. After the mixing on the morning of the fourth day it is found that the sugar content of fruit and syrup has equalized at 71%.

The process is now repeated for the last time by withdrawal of the spent syrup and replacement of the same with fresh syrup of 81% sugar content at a temperature of between 105 and 120° F. This will result after the final mixing on the morning of the fifth day in an equalized solids or sugar content of between 75% and 76%.

Under the conditions described above, the time required for each of the syrup changes, i.e. the withdrawal of spent syrup and the introduction of hot syrup of higher concentration and the equalization of the sugar concentration between syrup and fruit takes about eight hours. However, it is of course also possible by making suitable changes in the auxiliary equipment to somewhat shorten the time required. In order to be capable of withdrawing spent syrup within a reasonably short period of time, it is preferred to install a foraminous wall 9 or the like which has a relatively large liquid-permeable surface area. For instance, in the illustrated embodiment, the surface area of foraminous wall 9 equals about 100 square feet.

The thus-produced candied fruit with the last introduced syrup can then be pumped out and will leave the tank through outlet valve 12. Preferably, during pumping out of the finished mixture, screw 5 is turned in downward direction. The temperature of the mass during pumping should be between 105° and 110° F., in order to sufficiently reduce the syrup viscosity to allow for the draining off of syrup subsequent to removal of the mass from tank 1. Therefore, if on the morning of the fifth day, or at the time when the mass is to be removed from the tank, the temperature is too low, some of the syrup has to be withdrawn as previously described and replaced with syrup of higher temperature prior to removal of the syrup-candied fruit mixture from the treatment tank.

As described further above, the outer diameter of the screw is preferably between one-fifth and one-third of the inner diameter of the tank, and the rotational speed of the screw varies somewhat with the relationship between the diameters of the screw and the tank. Generally it has been found that in a tank having a diameter of 8', a screw of 36" diameter will be rotated at between 50 r.p.m. and 72 r.p.m., and a screw of 24" diameter at between 72 r.p.m. and 85 r.p.m These figures are approximations only, the optimum rotational speed depends on the specific conditions in each case particularly the type of fruit or other vegetable material which is to be treated According to the described embodiment, the pitch of screw 5 is such that the outer screw diameter equals the distance between vertically spaced adjacent points located at the periphery of the screw. However, while generally not required, it is possible to use screws with different pitch. Thereby it is to be noted that by reducing the pitch of the screw relatively more fruit and less syrup will be put in motion, and increasing the pitch of the screw will have the reverse effect.

It will be understood that each of the elements described above, or two or more together, may also find a useful application in other types of apparatus for impregnating particulate vegetable material differing from the types described above.

While the invention has been illustrated and described as embodied in an apparatus for candying fruit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a method of candying particulate liquid-containing and liquid-permeable vegetable material, the steps of introducing the particulate material and an aqueous sugar containing solution into a container to form a horizontal layer of the particulate material in the solution; moving a vertical column of said layer and solution in vertical direction so as to effect movement of the particulate material and of the solution and to move substantially all particles of said particulate vegetable material along annular paths located in vertical planes substantially without causing damage to the individual particles of said vegetable material whereby continuous treatment of superposed horizontal strata of said layer by differently concentrated horizontal strata of the solution is prevented and the concentration of sugar in the solution is uniformly reduced while the concentration of sugar in the particulate material is uniformly increased; and withdrawing the solution when the material has a selected concentration of sugar.

2. In a method of candying particulate liquid-containing and liquid-permeable vegetable material, the steps of introducing the particulate material and an aqueous sugar-containing solution into a container to form a horizontal layer of the particulate material in the solution; moving by a rotating helical surface at selected time intervals and for selected spaced time periods substantially at the center of said container a vertical column of said layer and solution in vertical direction so as to effect movement of substantially all particles of the particulate material and of the solution substantially without causing damage to the individual particles of said vegetable material along annular paths located in vertical planes whereby continuous treatment of superposed horizontal strata of said layer by differently concentrated horizontal strata of the solution is prevented and the concentration of sugar in the solution is uniformly reduced while the concentration of sugar in the particulate material is uniformly increased; and withdrawing the solution when the material has a selected concentration of sugar.

3. In a method of candying particulate liquid-containing and liquid-permeable vegetable material, the steps of introducing the particulate material and an aqueous sugar-containing solution into a container to form a horizontal layer of the particulate material in the solution; moving by a rotating helical surface at spaced time intervals a vertical column of said layer and solution selectively in upward and downward vertical direction so as to effect during said spaced time intervals continuous movement of substantially all particles of the particulate material and of the solution substantially without causing damage to the individual particles of said vegetable material along annular paths located in vertical planes whereby continuous treatment of superposed horizontal strata of said layer by differently concentrated horizontal strata of the solution is prevented and the concentration of sugar in the solution is uniformly reduced while the concentration of sugar in the particulate material is uniformly increased; and withdrawing the solution when the material has a selected concentration of sugar.

4. In a method of impregnating particulate liquid-containing and liquid-permeable vegetable material by treatment with a solution comprising solute dissolved in a solvent which is miscible with the liquid of said vegetable material, the steps of introducing said particulate vegetable material and said solution into a treating vessel to form therein a horizontal layer of particulate vegetable material in said solution; and moving a vertical column of said layer and solution in vertical direction so as to effect movement of the particulate material and of the solution and to move substantially all particles of said particulate vegetable material along annular paths located in substantially vertical planes, substantially without causing damage to the individual particles of said vegetable material, whereby continuous treatment of superposed horizontal strata of said layer by differently concentrated horizontal strata of the solution is prevented and the concentration of solute in the solution is uniformly reduced while the concentration of solute in the particulate vegetable material is uniformly increased; and withdrawing the solution when the vegetable material has a selected concentration of solute.

References Cited in the file of this patent

UNITED STATES PATENTS

| | | |
|---|---|---|
| 1,145,333 | Penn | July 6, 1915 |
| 1,496,807 | Bullock | June 10, 1924 |
| 1,762,654 | Edland | June 10, 1930 |
| 2,624,676 | Mako | Jan. 6, 1953 |
| 2,702,248 | Guadagni | Feb. 15, 1955 |
| 2,748,003 | Straub | May 29, 1956 |